United States Patent
Turner et al.

(10) Patent No.: US 10,275,858 B2
(45) Date of Patent: Apr. 30, 2019

(54) FLATTENING AND RECTIFYING A CURVED IMAGE

(71) Applicant: Microsoft Technology Licensing, LLC, Redmond, WA (US)

(72) Inventors: Jerome Joseph Turner, Kobe (JP); Christopher Chinwen Yu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/414,230

(22) Filed: Jan. 24, 2017

(65) Prior Publication Data
US 2018/0211366 A1    Jul. 26, 2018

(51) Int. Cl.
*G06T 5/00* (2006.01)
*G06T 7/13* (2017.01)

(52) U.S. Cl.
CPC ............ *G06T 5/002* (2013.01); *G06T 7/13* (2017.01); *G06T 2207/10004* (2013.01); *G06T 2207/10024* (2013.01)

(58) Field of Classification Search
CPC ................................. G06T 5/002; G06T 7/13
See application file for complete search history.

(56) References Cited

U.S. PATENT DOCUMENTS

| | | |
|---|---|---|
| 6,310,984 B2 | 10/2001 | Sansom-Wai et al. |
| 7,330,604 B2 | 2/2008 | Wu et al. |
| 7,457,445 B2 | 11/2008 | Cathier et al. |
| 8,717,632 B2 | 5/2014 | Zheng et al. |
| 8,787,695 B2 | 7/2014 | Wu et al. |
| 8,837,806 B1 | 9/2014 | Ethington et al. |
| 8,903,173 B2 | 12/2014 | Cooper |
| 9,035,944 B2 | 5/2015 | Werline |
| 9,208,536 B2 | 12/2015 | Macciola et al. |
| 9,495,735 B2 | 11/2016 | Wilson et al. |
| 2004/0013318 A1 | 1/2004 | Simske et al. |
| 2014/0198981 A1* | 7/2014 | Wilson ............... G06K 9/3283 382/162 |

OTHER PUBLICATIONS

Rosten et al: "Faster and Better: A Machine Learning Approach to Corner Detection", IEEE, 2010.*

(Continued)

*Primary Examiner* — Ruiping Li
(74) *Attorney, Agent, or Firm* — Jeffrey L. Ranck; Ranck IP Law

(57) ABSTRACT

Representative embodiments disclose mechanisms to flatten an image comprising at least one curved or bent edge. An image is received from a capture device and a UI is presented that allows a user to define a general vicinity of an item in the image to be flattened. The system analyzes pixels in the general vicinity to identify the highest probability of a corner in each general vicinity. The gradient of pixels between the corners is calculated and pixels scores are calculated based on the gradient. The pixels with the lowest scores between each corner are used as an edge. Smoothing is applied to each edge. Dimensions of the flat representation are calculated and the system maps pixels bounded by the edges and corners to pixels in the flat representation and copies the mapped pixels to the flat representation.

18 Claims, 9 Drawing Sheets

(56) References Cited

OTHER PUBLICATIONS

Ioannis Pitas, Digital Image Processing Algorithm, pp. 223-224, Prentice Hall, 1993.*
Liang, et al., "Flattening Curved Documents in Images", In Proceedings of IEEE Computer Society Conference on Computer Vision and Pattern Recognition, Jun. 20, 2005, 8 pages.
Rosten, et al., "Machine Learning for High-Speed Corner Detection", In Proceedings of the 9th European Conference on Computer Vision, May 7, 2006, pp. 1-14.

* cited by examiner

FLATTENING AND RECTIFYING A CURVED IMAGE

FIELD

This application relates generally to query systems. More specifically, embodiments disclosed herein include autosuggest and/or autocomplete technology for use in a wide variety of contexts where a system can suggest autocompletion of a query or question, particularly with natural language questions.

BACKGROUND

Images captured by a device, such as a mobile phone, are often curved either because the object is curved or because the lens effect. When the image is "flattened" to remove the curve, information on the image can be distorted. For example, an image of a curved paper, or text on a curved image becomes distorted when the image is flattened.

Furthermore, algorithms to flatten curved images tend to be computationally expensive and so are unsuited to implementation in a device with limited processing power such as a mobile device (cell phone, tablet or other such device).

It is within this context that the present embodiments arise.

DETAILED DESCRIPTION

Figure 1:
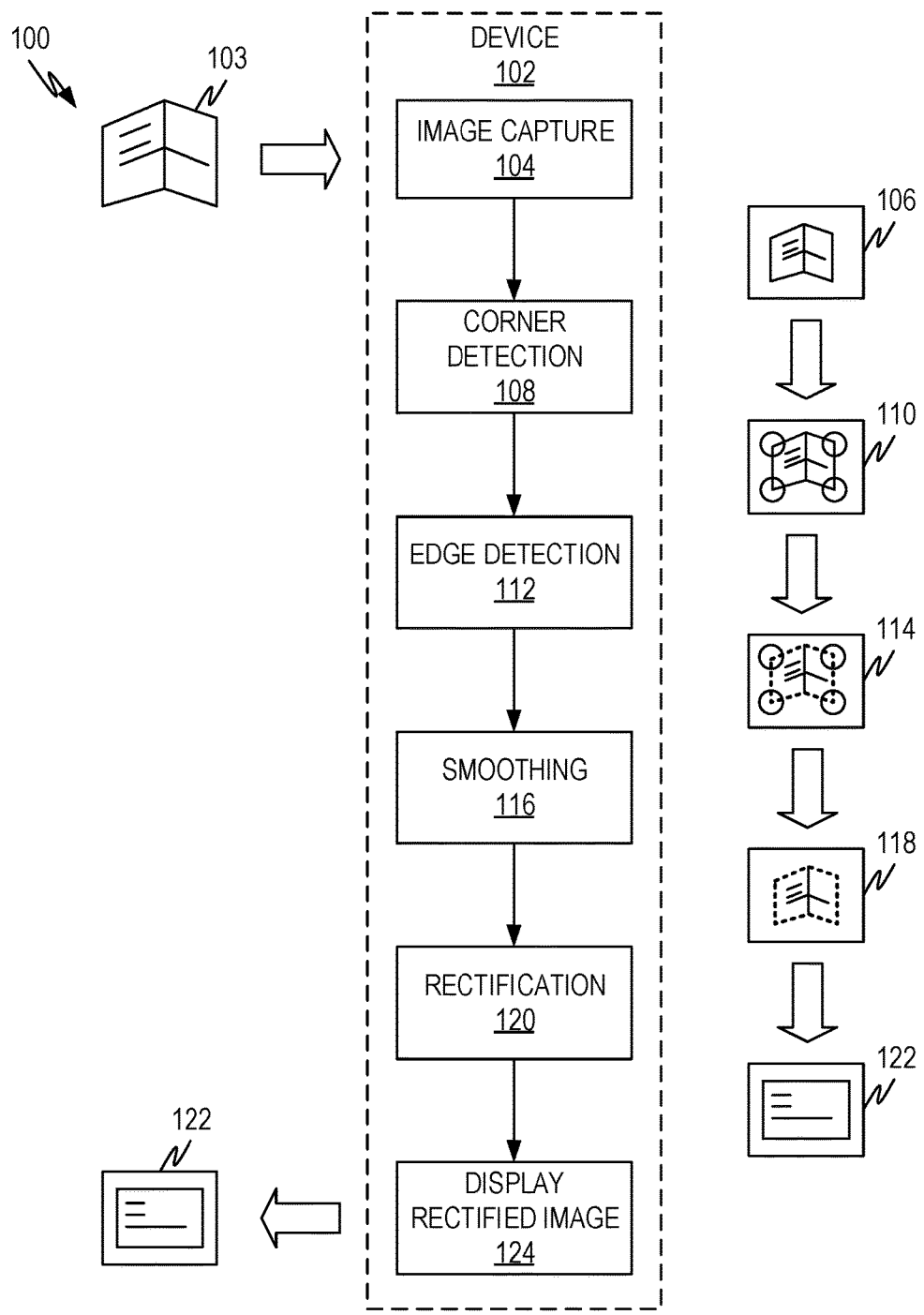
FIG. 1 illustrates an example image flattening and rectification architecture according to aspects of the disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

Curves happen naturally when printed text is on folded paper, books, cylindrical objects like cans or wine bottles or other situations. Photographs of curved text/diagrams are harder to read for both people and machines, hurting comprehension, possibilities for data re-use, Optical Character Recognition (OCR) accuracy and other uses.

Embodiments of the present disclosure target the distortion problem when flattening and rectifying an image having curved edges. The images can be captured by a camera (i.e., a mobile phone, tablet camera, or a separate camera), can be illustrations, 2D or 3D captures, renderings and so forth. Rectifying in this sense means to reduce the distortion that often comes with flattening an image with one or more curved edges. The arrangements presented in this disclosure can be implemented in a relatively low processing power environment such as a mobile phone, tablet or other such device. The arrangements can also be implemented in other environments.

One arrangement is a mobile application on a smartphone or tablet computer that allows users to first take a picture containing a curved or bent image, text document or text fragment, then point out the corners by dragging corner widgets, tapping on the corners, or in some other fashion. The application finds the best corner points in the vicinity of the indicated area (i.e., the widget, tap or however the corner vicinity was indicated).

The application analyzes the pixels in the vicinity and identifies the most probable corner. Pixels toward the center of the vicinity can be given greater weight when identifying the most likely corners. A gradient or other such calculation in the area can be used for base scores and weights applied to the gradient to identify the most likely candidate for a corner.

Once the corners are identified, the application calculates the gradient for pixels between the corners and uses the gradient to calculate a score for each pixel. Beginning at one corner, the pixels with the lowest score are selected until another corner is reached. The selected pixels represent an edge between the two corners. The process is repeated until all the edges have been identified. Smoothing can then be applied to the edges.

The area bounded by the edges is used to calculate the dimensions of a flattened representation of the area. The application then copies the color of each pixel from the area to the flattened representation by mapping pixels in the area to the flattened representation. The mapping can be accomplished by calculating a percentage along an X and Y axis for a pixel in the area and then using that percentage to identify a corresponding pixel in the flattened representation.

The resultant image has less distortion from the curved edges of the image and is often suitable for direct use in OCR algorithms, display to the user, and so forth.

DESCRIPTION

FIG. 1 illustrates an example image flattening and rectification architecture 100 according to aspects of the disclosure. The architecture performs flattening in such a way that the distortion errors occurring because of curved edges in an image are reduced (i.e., rectified). The architecture is illustrated as part of a device 102. The device can be any type of device such as a mobile device, tablet device, laptop or desktop computer and so forth. However, because of efficiencies that can be utilized in some arrangements, the described processes and architecture is well suited to low processing power environments such as a device that is part of the Internet of Things (i.e., security camera, etc.), mobile device, tablet device and so forth.

An image 106 is captured of an item 103 having at least one curved edge by an image capture device/process 104. The image capture device that is used can vary depending on the particular arrangement. For example, if the device 102 is a mobile or tablet device, the image capture device 104 can be an onboard camera. The image device 104 can also be a scanner, camera or other device that is not integrated with the device 102 in other arrangements. In still further arrangements, the image is a 2D or 3D rendering of an item 103.

The captured image 106 typically has the item 103 as well as background content. Thus, the device 102 can utilize a corner detection process 108 to identify corners of the item. In some arrangements, the system can perform image processing to identify the image in the background content. In other arrangements, the device 102 can provide a user interface that allows a user to identify the corner areas of the item. For example, the captured image can be displayed to the user and the user can select the corners such as by tapping the corners, dragging a widget (i.e., an overlay in the shape of a circle, bounding box, etc.) on top of each corner, clicking a mouse on each corner to select them, and so forth.

When a finger is used to touch or tap the image 106 to indicate where the corners are, or if the user drags a widget, sizes a bounding box, or other indicator to identify where the corners are, the indicated area is typically larger than the actual corner. It is difficult to be precise when using a touch screen to indicate where the corners are. However, users are typically pretty good at placing the corner toward the center of the widget, touched area, etc. Thus, the widget, touched area, and so forth indicates a general vicinity where the corner can be found.

Any corner detection algorithm can be used to find the most likely corner in the vicinity of the touched area. In one arrangement, the FAST (Features from Accelerated Segment Test) algorithm. This algorithm is well known. In one arrangement, the FAST algorithm is modified to give the candidates toward the center of the vicinity a higher weight. In this modification, in FAST's non-maximum suppression operation, the potential candidates are weighted by their distance to the center of the vicinity to give those candidates preference over candidates farther from the center. Identifying corners is discussed in greater detail below in conjunction with FIG. 2.

Once the corners have been identified, represented by image 110, the device 102 performs an edge detection process 112 to identify edges that connect the corners. Edge detection is performed by finding the gradient value for each pixel between the corners. The gradient values are weighted as discussed below to arrive at a score for each pixel between the corners. Then beginning at a corner, the surrounding pixels are examined and pixels with the lowest score are selected as the edge between the corners. The process is further described in conjunction with FIGS. 3-6 below. The result of the edge detection process 112 is illustrated by image 114.

Because the pixels selected by the edge detection process 112 can define a relatively "jagged" edge, a smoothing process 116 can be used to smooth the edges. Although any smoothing process can be used, one arrangement utilizes a moving average, such as a simple moving average, a cumulative moving average, weighed moving average, exponential moving average, and so forth. For an edge, the moving average is calculated based on a radius from the point being smoothed. In a representative smoothing process 116, the moving average is calculated as:

$$sp_i = \frac{\sum_{j=-x}^{x} p_{i-j}}{2x+1}$$

Where $sp_i$ is the smoothed pixel in $i^{th}$ location of the smoothed pixel array, $p_n$ is the unsmoothed pixel at the $n^{th}$ location of the unsmoothed pixel array and x is the radius for the smoothing.

The edges of the item can be curved (i.e., as in the case of the edges of a page from a book laid on a scanner) or can be more sharp (i.e., as in the case of a crease in a folded piece of paper). There is a tradeoff between the radius of the moving average and the "responsiveness" of the average. For example, a large radius results in slower responsiveness and potentially a larger distance to the actual edge if there is a sharp deviation (i.e., curve and/or direction change) in the edge. In most applications, a radius between 5 and 20 pixels is sufficient. In any event, those of skill in the art can readily tune the moving average to give smooth edges while following expected edge deviations (i.e., curves and/or direction changes). The image with smoothed edges is represented by image 118.

Figure 7:
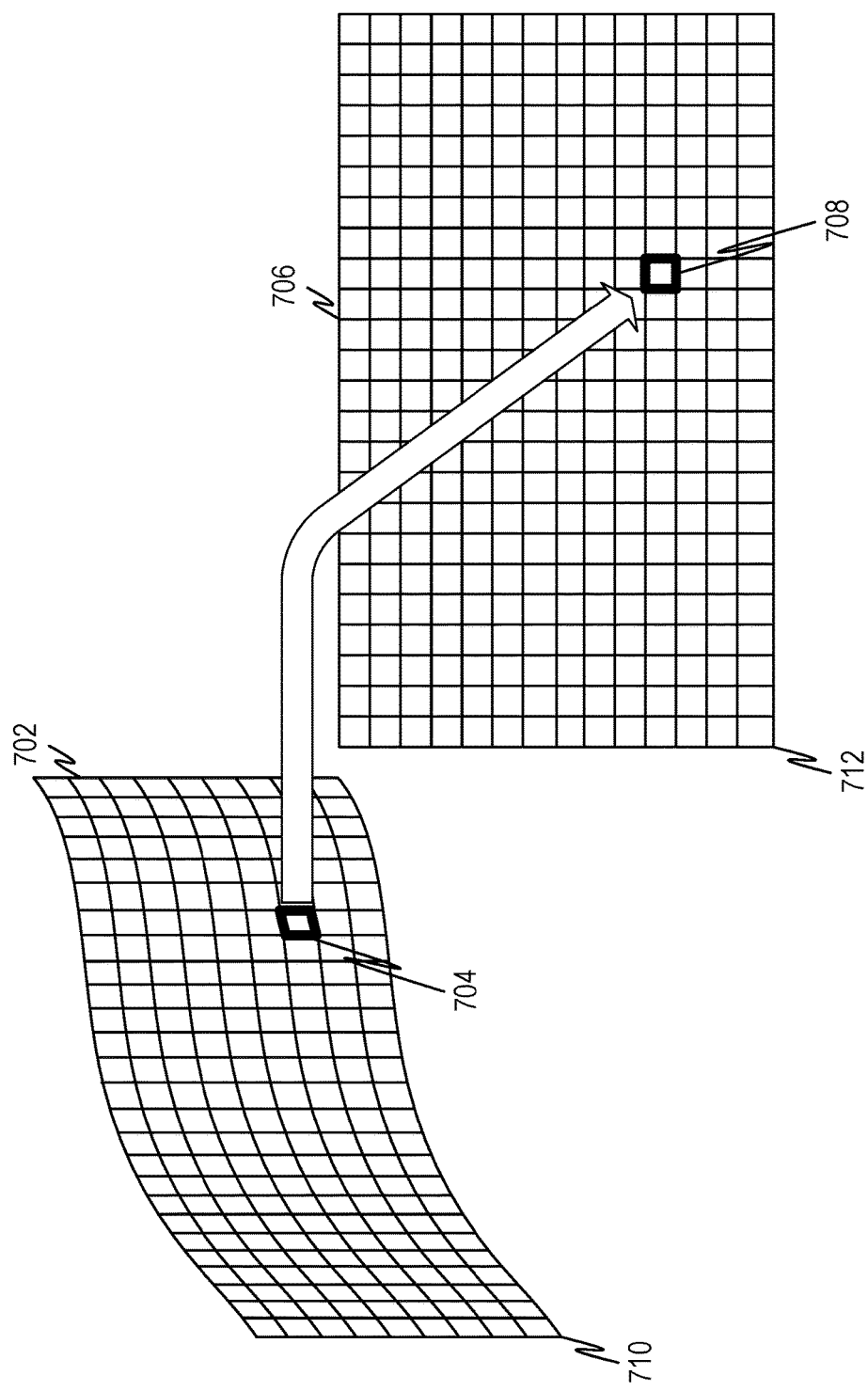
FIG. 7 illustrates copying information from the curved image to a flat representation according to aspects of the disclosure.
Figure 8:
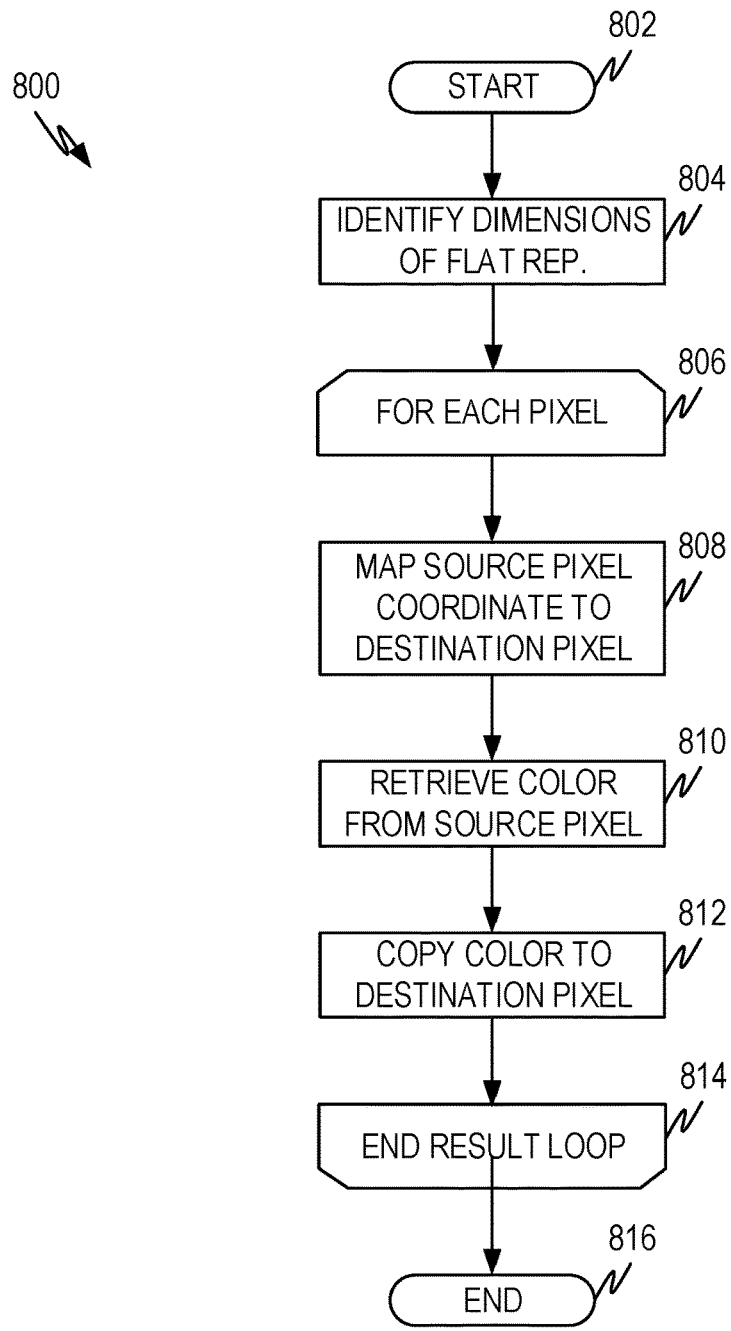
FIG. 8 illustrates a flow diagram for copying information from the curved image to a flat representation according to aspects of the disclosure.

After the edges are smoothed, the image is rectified by rectification process 120. Rectification process 120 is illustrated in FIGS. 7-8 below. In general, the rectification process 120 first identifies the dimensions of a flattened representation of the item 103. In other words, the process first answers the question of: if the item was flattened, what would its dimensions be. Once the flattened representation dimensions are identified, then the rectification process creates a mapping between the pixels of the item image (i.e., as defined by the smoothed edges) and the flat representation. The mapping can be based on the percentage coordinates (i.e., X-Y) in the item image as explained below. The rectified image is represented by image 122.

Once the image is rectified, the image can be displayed (i.e., process 124), can be passed on an OCR process, or used in other contexts.

Figure 2:
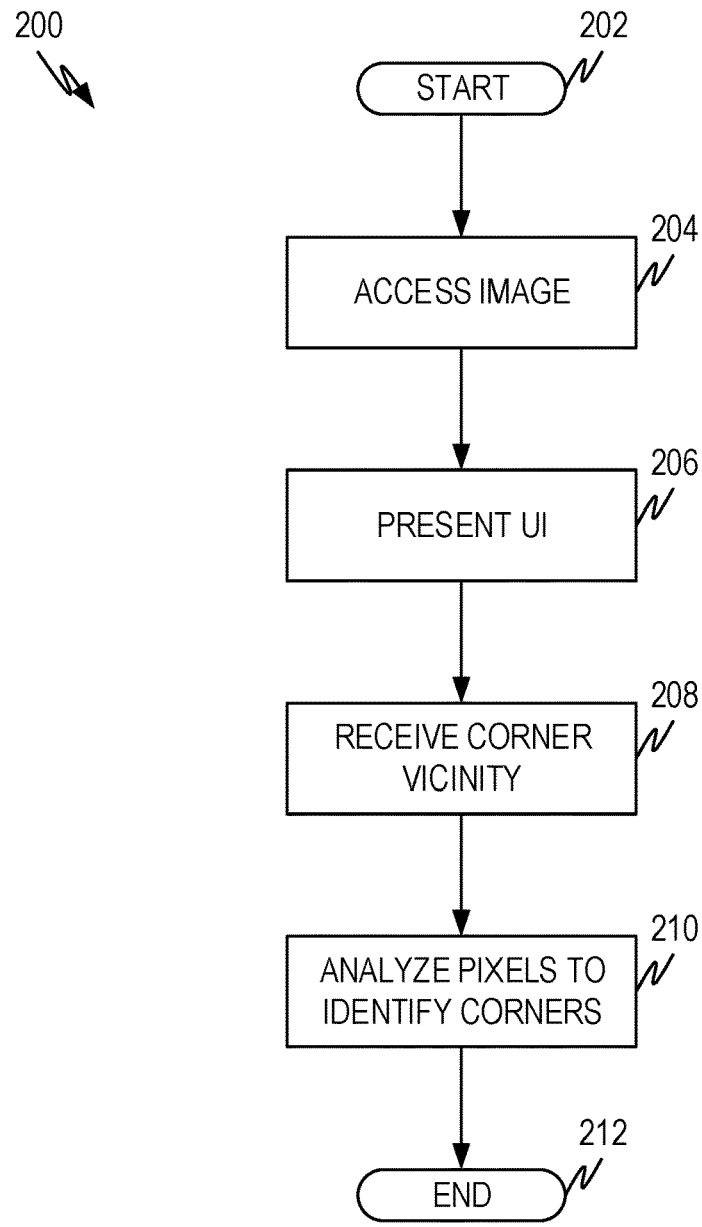
FIG. 2 illustrates an example flow diagram for identifying the corners of an image to be flattened and rectified according to aspects of the disclosure.

FIG. 2 illustrates an example flow diagram for identifying the corners of an image to be flattened and rectified according to aspects of the disclosure. The process is suitable for use in a device where the user is presented the opportunity to identify the corners of the item in the captured image.

The process begins at operation 202 and proceeds to operation 204 where the image is accessed. As described above, the image can come from the built-in camera of a device, or can have been captured from another source (i.e., scanner, external camera, etc.) or can be a 2D or 3D rendering of an item.

In operation 206 a user interface is presented that allows the user to select the general vicinity of the corners of the item to be flattened in the image. The method of selection depends on the device where the process is running. If the device is a touch device, the user can indicate the general vicinity of the corners by touching the corners, i.e., with a finger. In the alternative, the user can drag markers (also called widgets) on top of the corners. For example, the widget can be a circle or other shape that the user can drag and drop on top of the corner of the item. In yet another alternative, a bounding box can be displayed and the user can drag the corners of the bounding box to correspond to the corners of the item. Combinations can also be used. When the device is not a touch device, the user can use a pointing device (mouse, touchpad, etc.) to perform the same functions (i.e. click on the corners, drag widgets, drag a bounding box, etc.).

The result of operation 206 is that the user has indicated the general vicinity of the corners of the item (i.e., by touching, clicking, etc.). Operation 208 receives the input from the user interface and identifies a set of pixels that define the general vicinity of the corners. For example, when the corners have been indicated by a touch, the touch area (i.e., width of the fingertip) can define the general vicinity. In the case of widgets, the boundary of the widget can define the vicinity. It is not necessary to define the vicinity with a great degree of precision, as long as the corner is included in the vicinity.

Operation 210 analyzes the pixels in the vicinity of each corner to identify the most likely real corner. In one representative example, a modified version of the FAST corner detection algorithm is used where in FAST's non-maximum suppression operation, the potential candidates are weighted by their distance to the center of the vicinity in order to give those candidates preference over candidates that are further away from the center. Other corner detection algorithms can also be used.

The corner is then selected as the most likely pixel based on the analysis above. The process then ends at operation 212.

Figure 3:
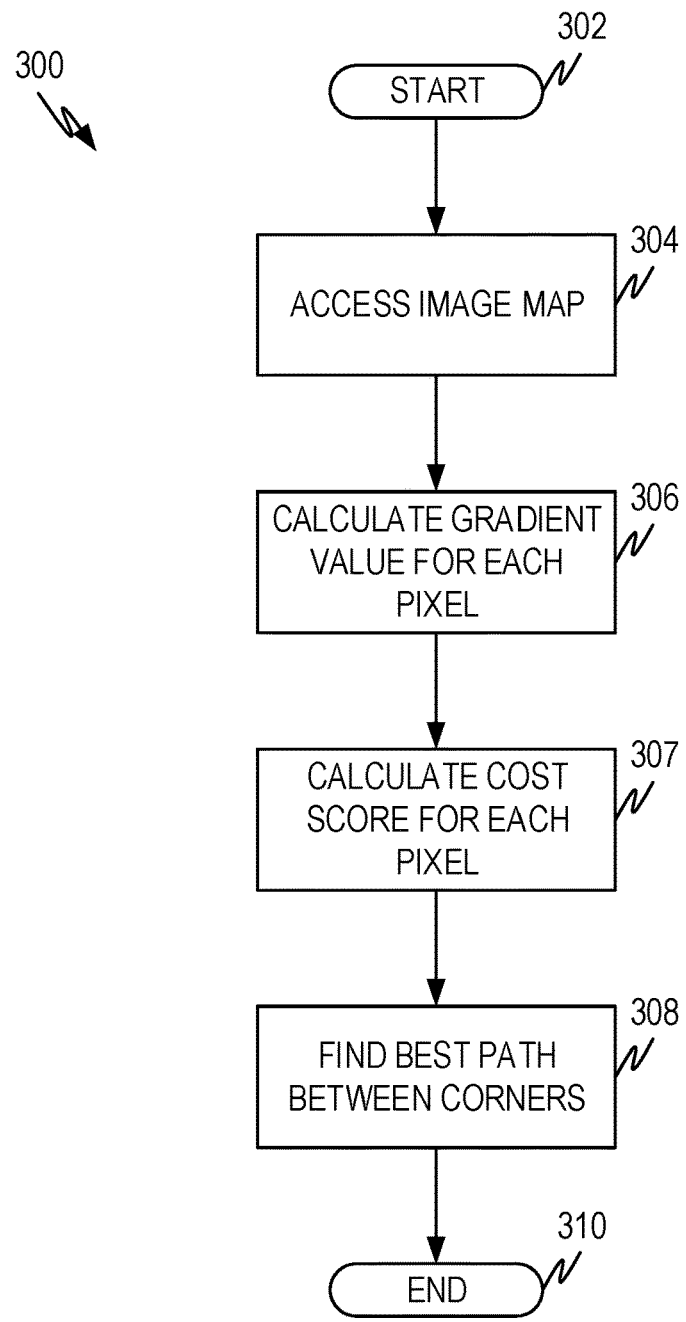
FIG. 3 illustrates a flow diagram for identifying the edge of an image to be flattened and rectified according to aspects of the disclosure.

FIG. 3 illustrates a flow diagram 300 for identifying the edge of an image to be flattened and rectified according to aspects of the disclosure. The process 300 begins at operation 302 and proceeds to operation 304 where the image map is accessed. The image map in this instance is selected to include the corners identified from the corner detection process 112/FIG. 3. That is not to say that the image map must include the entire captured image (i.e., the image captured by image capture process 104). The image can be cropped to reduce the overall processing required as long as the cropped image map includes the edges of the item. Since edges can be curved or bent, this may mean that the cropped image map also includes pixels that lay outside the absolute X-Y locations defined by the corners. In a representative example, the corner detection process can allow the user to crop (i.e., set a bounding box) for the area that includes the item of interest.

Operation 306 calculates the gradient value for each of the pixels in the image map. In a representative arrangement, the Sobel Gradient is used to calculate the gradient value. The Sobel gradient assigns high values to likely to be an edge. However, since the "best path" algorithm of operation 308 utilizes low scores in the path finding algorithm, operation 307 assigns scores so that higher gradient scores map to lower initial scores in the cost map. Operation 307 also uses the initial scores to calculate a cost map as explained in greater detail below.

Once the Sobel gradient value (operation 306) for each of the pixels in the image map have been assigned and cost scores are calculated therefrom (operation 307), operation 308 finds the best path between the corners in the image map. Finding the best path comprises two operations. The first is to calculate a score based on the gradient value of the pixel. The second is to use the scores to find the best path between the corners. Calculating cost scores will be discussed in FIG. 4 below and finding the best path will be discussed in FIGS. 5 and 6 below.

The process ends at operation 310 after all edges have been identified.

Figure 4:
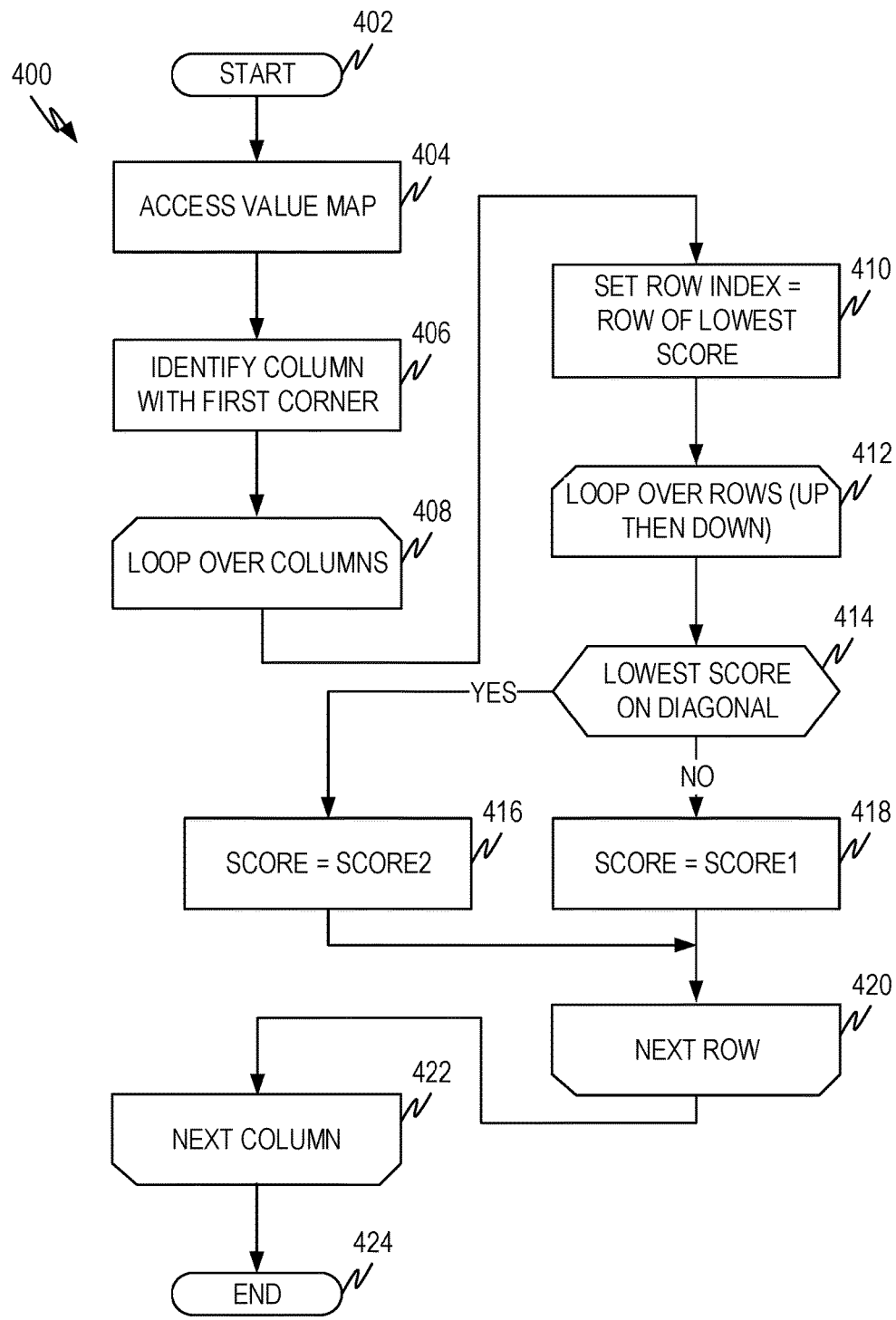
FIG. 4 illustrates a flow diagram for calculating scores for each pixel to aspects of the disclosure.

FIG. 4 illustrates a flow diagram 400 for calculating scores based on the gradient values for each pixel to aspects of the disclosure. The process begins at operation 402 and proceeds to operation 404 where the value map is accessed. The value map is a mapping of the gradient values. This mapping can be performed by operation 404 or mapping can be performed elsewhere and operation 404 accesses the mapping.

When the Sobel gradient is used, the gradient values for pixels that are more likely to be edges are higher than pixel values more likely not to be edges. However, for the best path algorithm, which is discussed below, scores are assigned so that lower than pixel values are more likely to be edges. Any method that maps the Sobel gradient values to scores where low scores correspond to higher gradient values can be used. A liner scale, a logarithmic scale or any other scale can be used to map the Sobel gradient values to an initial score value. In one example, the highest gradient value is mapped to a minimum of 1 for a strong gradient value and become increasingly higher as the gradient scores become smaller. In order to illustrate the best path algorithm, assume the mapping assigned the Sobel gradient values to the following initial scores:

|   | A | B | C | D | E |
|---|---|---|---|---|---|
| 1 | 3 | 3 | 6 | 6 | 5 |
| 2 | 1 | 2 | 5 | 6 | 4 |
| 3 | 3 | 4 | 1 | 5 | 3 |
| 4 | 4 | 5 | 2 | 4 | 1 |
| 5 | 4 | 4 | 4 | 2 | 3 |

Assume the values in the boxes A2 and E4 represent the corners of the image. Starting with a corner, the process assigns a score to each pixel that describes the "cost" of reaching this pixel from the starting corner. The cost, p, is calculated based on the lowest cost of the surrounding pixels plus the gradient value for the pixel p. If the pixel cost was on a diagonal, a factor of square root of 2 is used to take into account the longer distance between the pixels. In other words, the cost, $c_p$, for a pixel, p, with an initial score value, $v_p$, is given by:

$$c_p = \begin{cases} v_p + \min_i v_i, & \text{if } \min_i v_i \text{ is not on a diagonal} \\ v_p + \sqrt{2} \min_i v_i, & \text{if } \min_i v_i \text{ is on a diagonal} \end{cases}$$

Where i indexes over the surrounding pixels.

On processor limited systems, a modification can be used that calculates the cost values by columns the start corner to the end corner if the edge is generally horizontal or by rows from the start corner to the end corner if the edge is generally vertical. To identify whether the cost should be calculated by rows or columns, the value of the rows and columns should be compared and the cost calculated across the greatest number. Thus, if the number of rows is greater than columns, the cost should be calculated by rows and by columns if the number of columns is greater than the number of rows. For FIG. 4, the assumption is that the number of columns is greater than the number of rows. If not, then column should be replaced with row.

Once the initial score value map is accessed, operation 406 identifies the column with the starting corner. For the value map above, the algorithm can start at either end (i.e., the first or last column). In this example, the first column (A) is taken as the starting column. The score for the initial corner in box A2 is set to zero. In the above map this results in:

|   | A | B | C | D | E |
|---|---|---|---|---|---|
| 1 |   |   |   |   |   |
| 2 | 0 |   |   |   |   |
| 3 |   |   |   |   |   |
| 4 |   |   |   |   |   |
| 5 |   |   |   |   |   |

Operations 408-422 represents a loop across all the columns to calculate the scores. Operation 410 sets the row index as the row with the lowest score in the current column. For the first pass through the loop this is the second row (i.e., the corner value set to zero). Operations 412-420 loops over all the rows starting with the row where the lowest value was found. After the row where the lowest value was found is calculated, the loop moves upward first (i.e., starts with the row above where the lowest value was found) and continues moving upward until there are no rows remaining. The loop then moves down starting with the row below where the lowest value was found until no more rows are remaining. The next column is calculated.

For the first pass, the corner has already been set to zero score so the algorithm skips that row and loops up to the top row.

Operation 414 checks the adjacent pixels in the column and in the previous column that has already been scored for the lowest surrounding pixel. The if the lowest score is not on the diagonal, the score is calculated as Score1 (operation 418), which is given by the non-diagonal equation above:

$$\text{Score1} = v_p + \min_i v_i$$

If the score is on the diagonal the "YES" branch is taken and the score is given by operation 416:

$$\text{Score2} = v_p + \sqrt{2} \min_i v_i$$

Assuming, as in this example, the columns are scored from left to right, the pixels checked for the lowest score are illustrated below, where the current pixel is in box C3 and the pixels marked with an X in boxes B2, C2, B3, B4, and C4 are checked:

|   | A | B | C | D | E |
|---|---|---|---|---|---|
| 1 |   |   |   |   |   |
| 2 |   | X | X |   |   |
| 3 |   | X | Current Pixel |   |   |
| 4 |   | X | X |   |   |
| 5 |   |   |   |   |   |

In other words, the pixel above and below as well as the three adjacent pixels to the left. Returning to the example, the score for the corner box M (i.e., above the 0 score for the corner) is calculated based on the pixel below it box A2 (i.e., the 0 score) since there are no pixels above or to the left.

Since the lowest score is the corner score (i.e., 0), and the corner score is not on a diagonal, the "NO" branch is taken out of operation 414 to operation 418 and the score is calculated based on the equation for Score1. Here the lowest score is the corner score (i.e., 0) and the value of the pixel is 3 (from the table above) resulting in a cost score of 3:

|   | A | B | C | D | E |
|---|---|---|---|---|---|
| 1 | 3 |   |   |   |   |
| 2 | 0 |   |   |   |   |
| 3 |   |   |   |   |   |
| 4 |   |   |   |   |   |
| 5 |   |   |   |   |   |

The loop over operations 412-420 is repeated for the first column A resulting in:

|   | A | B | C | D | E |
|---|---|---|---|---|---|
| 1 | 3 |   |   |   |   |
| 2 | 0 |   |   |   |   |
| 3 | 3 |   |   |   |   |
| 4 | 7 |   |   |   |   |
| 5 | 11 |   |   |   |   |

The process then loops to the next column B at operation 422. Operation 410 sets the row index to the row of the lowest score in the prior column. In this case, the row index would be two (i.e., the row with the zero score). Operation 412-420 then start with the current row index and loops up and down over all rows. Operation 414 calculates the score for the pixel under consideration ($2^{nd}$ column, $2^{nd}$ row) by checking the pixels up and down and the three adjacent left pixels to identify the minimum. Since there is no score above or below the current pixel, the lowest value comes from the first column, $2^{nd}$ row (i.e. the zero corner score in box A2) resulting in the value being calculated as score1 (operation 418) resulting in:

|   | A | B | C | D | E |
|---|---|---|---|---|---|
| 1 | 3 |   |   |   |   |
| 2 | 0 | 2 |   |   |   |
| 3 | 3 |   |   |   |   |
| 4 | 7 |   |   |   |   |
| 5 | 11 |   |   |   |   |

The row loop then goes to the pixel above (column B, row 1) and operation 414 checks the lowest surrounding pixel score. This is the zero score of column A, row 2. Since this score is on the diagonal, execution proceeds to operation 416 where the score is calculated by score2:

|   | A | B | C | D | E |
|---|---|---|---|---|---|
| 1 | 3 | 4.24 |   |   |   |
| 2 | 0 | 2 |   |   |   |
| 3 | 3 |   |   |   |   |
| 4 | 7 |   |   |   |   |
| 5 | 11 |   |   |   |   |

Repeating the flow diagram over the remaining rows and columns results in the full cost map:

|   | A  | B     | C     | D     | E     |
|---|----|-------|-------|-------|-------|
| 1 | 3  | 4.24  | 10.49 | 15.49 | 18.97 |
| 2 | 0  | 2     | 7     | 11.90 | 14.04 |
| 3 | 3  | 5.66  | 3.41  | 8.41  | 11.41 |
| 4 | 7  | 10.07 | 5.41  | 9.07  | 9.65  |
| 5 | 11 | 12.66 | 9.41  | 8.24  | 11.24 |

The process then ends at operation 424.

Figure 5:
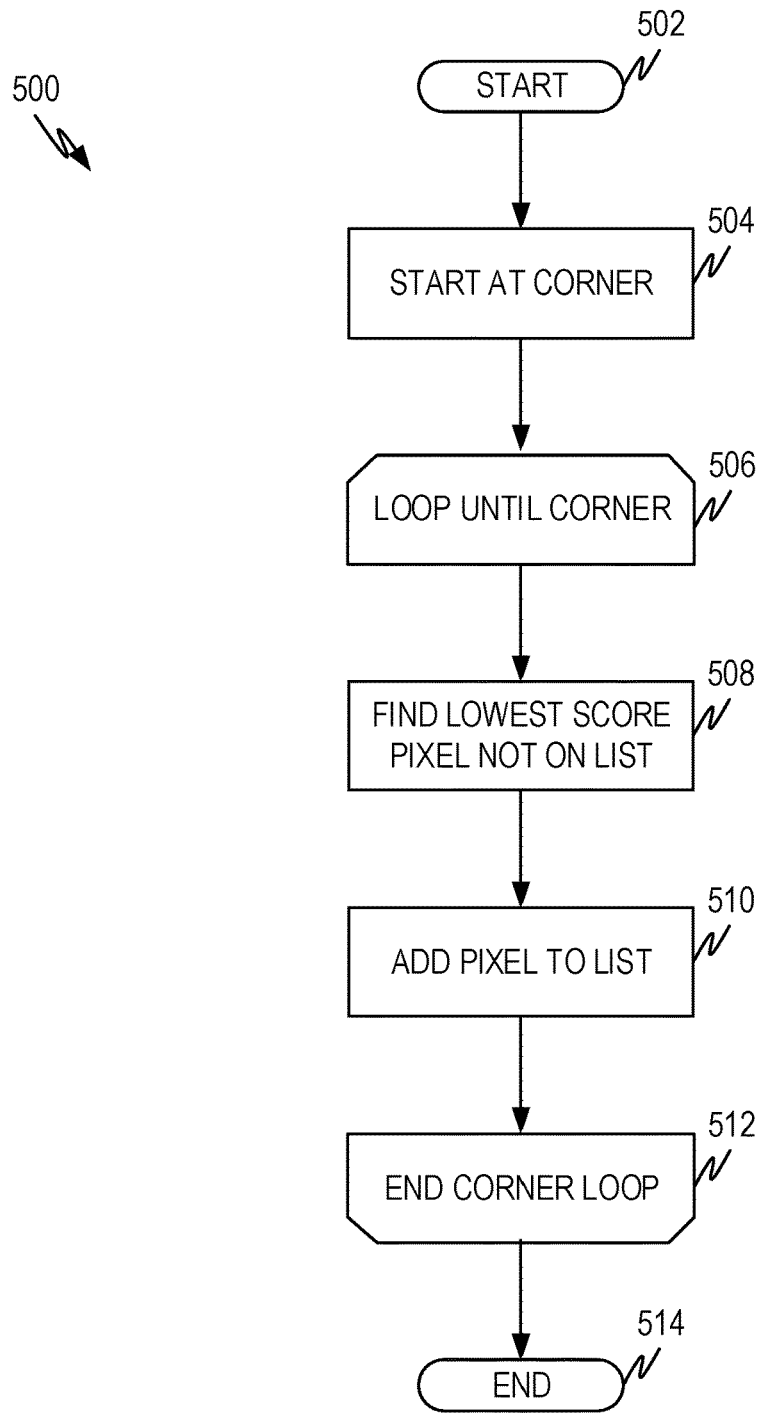
FIG. 5 illustrates a flow diagram for finding a path between two corners according to aspects of the disclosure.
Figure 6:
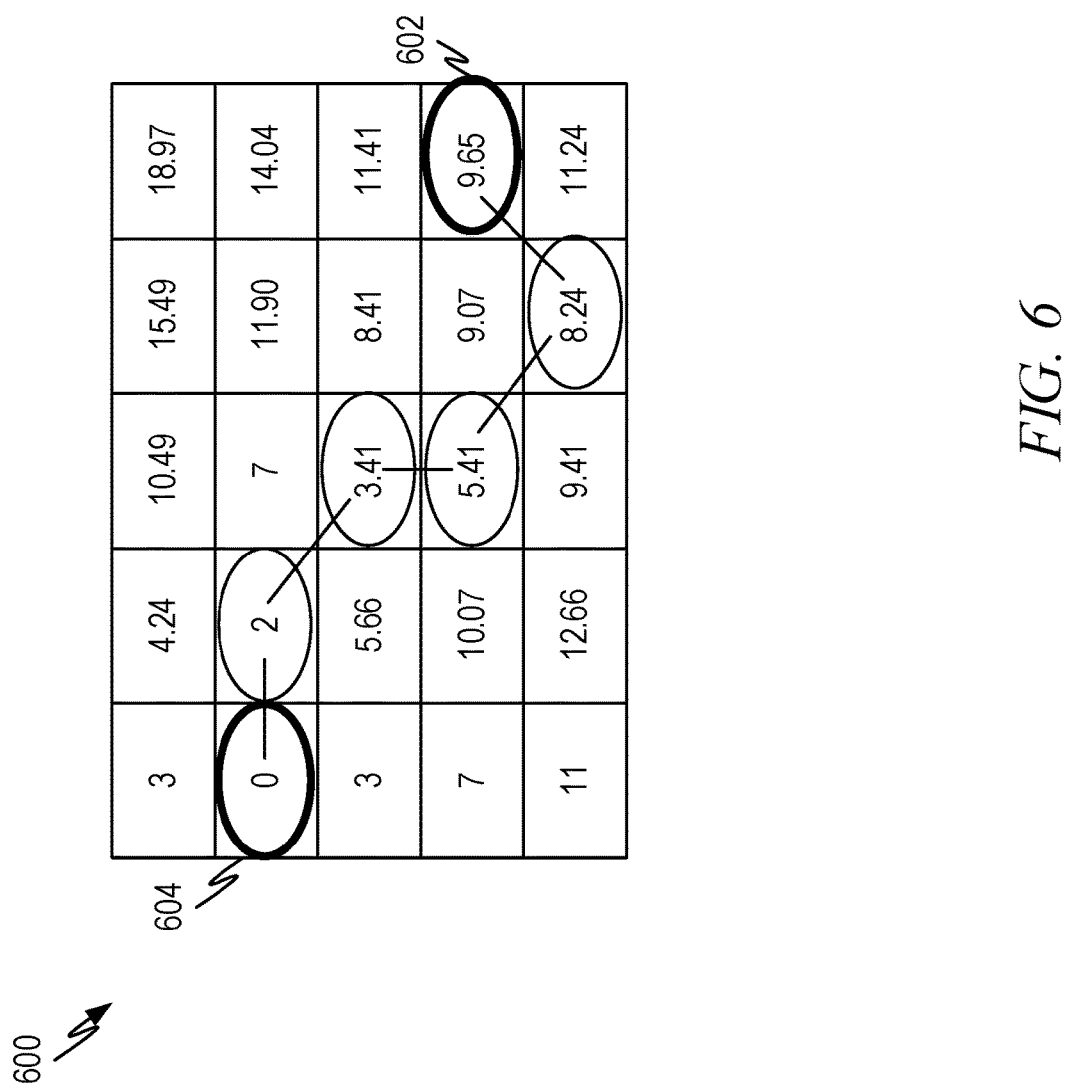
FIG. 6 illustrates a selected path between two corners according to aspects of the disclosure.

FIGS. 5 and 6 will be discussed together to illustrate finding an edge that is the lowest cost path between two corners.

FIG. 5 illustrates a flow diagram 500 for finding a path between two corners according to aspects of the disclosure. The flow diagram illustrates how, for example, operation 308 is performed. The flow diagram 500 operates on the cost map, such as a cost map produced by flow diagram 400.

The process begins at 502 and proceeds to operation 504 where a corner is selected. Turning for a moment to FIG. 6, a representation of the cost map 600 used as an example above is reproduced. The two corner scores are illustrated as 602 and 604 and are highlighted by the bold ovals. This cost map will be used as the example in describing the flow diagram of FIG. 5.

Returning to FIG. 5, operation 504 selects a corner. In this instance, the corner selected is corner 602 with a cost score of 9.65. Operations 504-512 represent the loop across all pixels to identify the lowest cost path between two corners. The flow diagram 500 will be performed once for each edge to be detected.

Once the corner is selected (operation 504), operation 508 evaluates the surrounding pixels and picks as the next pixel the pixel with the lowest score. On the first pass, with corner 602 selected as the starting corner, the pixels with the scores of 11.41, 8.41, 9.07, 8.24 and 11.24 are examined. The lowest score that is not already on the list of pixels defining the path is the pixel with the score of 8.24. Thus, this pixel is added to the list (operation 512) as indicated by the oval surrounding the pixel in FIG. 6.

The loop continues at operation 512 until the other corner is reached. This results in a list of pixels that defines the lowest cost path between the two corners (602 and 604 of FIG. 6). The list of pixels is thus given by:

| Pixel Number | Score |
|--------------|-------|
| 1 (corner 1) | 9.65  |
| 2            | 8.24  |
| 3            | 5.41  |
| 4            | 3.41  |
| 5            | 2     |
| 6 (corner 2) | 0     |

FIG. 6 illustrates this path of pixels by the ovals that circle the respective scores.

Once the path between the two corners has been identified, the process ends at operation 514.

Returning for a moment to FIG. 1, after the path has been determined (i.e., the edge have been detected in operation 112, and the edges smoothed (as discussed above), the rectification process 120 converts the area bound by the smoothed edges into a flat representation. This process is illustrated in FIGS. 7 and 8. FIG. 7 illustrates copying information from the curved image 702 to a flat representation 706 according to aspects of the disclosure. FIG. 8, discussed below, represents a flow diagram for the rectification process.

The rectification process comprises two main operations. In the first operation, the dimensions of the flat representation are determined. This process estimates the length of the curved edges and uses that length to define the length of the corresponding edge of the flat representation 706. The second main operation maps pixels 704 in the curved image 702 to the corresponding pixel 708 in the flat representation. The color of the first pixel 704 is then copied into the corresponding pixel 708.

FIG. 8 illustrates a flow diagram 800 for copying information from the curved image 702 to a flat representation 706 according to aspects of the disclosure. The process begins at operation 802 and proceeds to operation 804 where the dimensions of the flat representation are calculated. The process used to accomplish operation 804 depends on the processing power available in the device where the process is implemented. For devices that have sufficient of processing power, a 3D model can be fit to the 2D shape defined by the edges. The 3D model can then be used to identify the length of edges of the flat representation 706. If the system assumes that the item (i.e., item 103) is a rotation of a 2D shape (i.e., a piece of paper, a polygon on a curved surface, the page of a book, etc.), then the method used can make some assumptions about the item 103 to calculate the length of the curved edges of the item.

When a lens with a particular focal length is used to take a picture of a straight line, the focal length introduces a curvature to the line. The relationship between curvature and focal length is well known and corrections therefore are also known. Given this relationship, another way to estimate the length of a curved side is to match the curved side to the curvature introduced by a given focal length lens. The correction factor for the focal length can then be used to estimate the length of the corresponding straightened edge. If data from the camera showing the orientation of the camera relative to the item 103 are available, the orientation data can also be used to correct the foreshortening seen when a flat image is rotated relative to a viewing location. Such methods are also known.

Once the dimensions of the flat representation are identified by operation 804, execution proceeds to the loop of operations 806-814 where all pixels in the curved image are mapped to the corresponding pixel in the flat representation and the color copied from the curved image to the flat image.

Operation 808 estimates the coordinate of the curved image as a percentage of X and Y. The percentage is calculated as a percentage from an origin corner along the X dimension of the object and a percentage from the origin corner along the Y dimension. Referring to FIG. 7 for a moment, if corner 710 is the origin corner of the curved image 702, and pixel 704 is the pixel under consideration, then operation 808 estimates the percentage along the X and Y dimensions. As an approximation, operation 808 can calculate the percentage of X as the number of the pixels from the origin corner (i.e. 710) compared to the total number of pixels along the X edge (i.e. the lower edge of 702). The percentage of Y can be calculated in a similar manner.

The destination pixel is then calculated as the pixel located at the same percentage of X and percentage of Y in the flat representation. Thus, if %Y is the percentage along the Y axis and %X is the percentage along the X axis the topY, bottomY, rightX and leftX are the Y and X coordinates of the corners of the curved image, and bottomY$_f$ and leftX$_f$ are the Y and X coordinates of the origin corner in of the flat representation, then the X and Y coordinates of the destination pixel are given by:

$Y_d=\text{INT}(\text{bottom}Y_f+\% \; Y(\text{top}Y-\text{bottom}Y))$ $X_d=\text{INT}(\text{left}X_f+\% \; X(\text{right}X-\text{left}X))$ The above equations assume values increase from left to right and from bottom to top. If the values increase from left to right and top to bottom, the destination pixel is given by:

$Y_d=\text{INT}(\text{bottom}Y_f+\% \; Y(\text{bottom}Y-\text{top}Y))$ $X_d=\text{INT}(\text{left}X_f+\% \; X(\text{right}X-\text{left}X))$ After mapping between the source and destination pixels, the color from the source pixel is retrieved (operation 810) and copied to the destination pixel (operation 812). Copying the color from a source pixel in the curved image 702 to the corresponding destination pixel in the flat representation 706 creates the rectified flat representation. The process ends at operation 816 after all pixels have been copied.

Example Machine Architecture and Machine-Readable Medium

Figure 9:
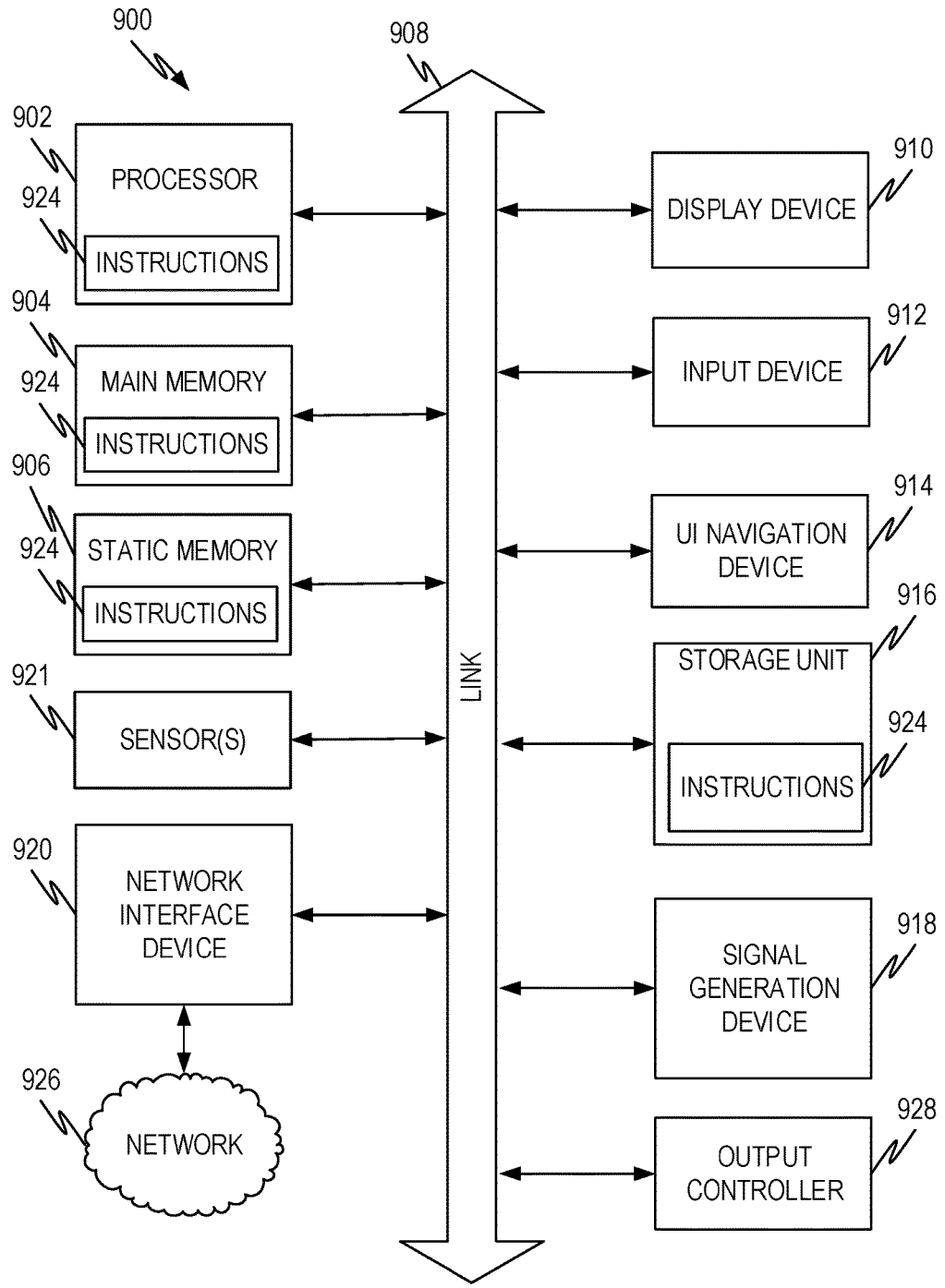
FIG. 9 illustrates a representative machine architecture suitable for implementing the systems and other aspects disclosed herein or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Executable Instructions and Machine-Readable Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for flattening an image comprising:

receiving an image comprising an object having a non-linear side (106);

identifying a plurality of corners of the object, the plurality of corners defining a region of the image to be flattened (108, 210);

defining a gradient between each of the plurality of corners (306);

using the gradient to identify an edge between each of the plurality of corners, one edge approximating the non-linear side (112, 307, 308);

establishing the dimensions of a flat representation (804);

mapping each pixel in the region of the image to a pixel in the flat representation (808); and filling each pixel in the flat representation with the color of the corresponding pixel in the region of the image (810, 812).

Example 2

The method of example 1 further comprising smoothing each edge.

Example 3

The method of example 1 wherein identifying the corners of the object comprises:
receiving an indication of a general vicinity of each corner;
analyzing pixels in the general vicinity to identify each corner.

Example 4

The method of example 3 further comprising:
receiving a location of a widget, the widget defining the general vicinity;
giving a higher weight to pixels at a center of the widget when analyzing pixels to identify a corner.

Example 5

The method of example 4 wherein the widget is placed by a user.

Example 6

The method of example 1 wherein using the gradient comprises defining a score for pixels between the corners.

Example 7

The method of example 6 wherein the score for a pixel is calculated based on the gradient of the pixel and the gradient of a surrounding pixel.

Example 8

The method of example 7 wherein identifying the edge comprises:
identifying a current pixel representing a corner;
checking pixels surrounding the current pixel and picking as a next pixel in the edge a pixel with the lowest score;
setting the current pixel as the next pixel;
repeating the checking and setting operations until a second corner pixel is reached.

Example 9

The method of example 1 wherein mapping and filling comprise:
establishing a percentage in an X and Y dimension in the region of the image; and
copying the color of the pixel in the region of the image at the percentage in the X and Y dimension to a pixel in the flat representation in at the percentage in the X and Y dimension.

Example 10

A system for completing a question comprising:
a processor and executable instructions accessible on a computer-storage medium that, when executed, cause the processor to perform operations comprising:
receive an image comprising an object having a non-linear side (106);
identify a plurality of corners of the object, the plurality of corners defining a region of the image to be flattened (108, 210);
define a gradient between each of the plurality of corners (306);
use the gradient to identify an edge between each of the plurality of corners, one edge approximating the non-linear side (112, 307, 308);
establish the dimensions of a flat representation (804);
map each pixel in the region of the image to a pixel in the flat representation (808);
and
fill each pixel in the flat representation with the color of the corresponding pixel in the region of the image (810, 812).

Example 11

The system of example 10 further comprising smooth each edge.

Example 12

The system of example 10 further comprising:
receive a location of a widget, the widget defining a general vicinity of a corner;
analyze pixels in the general vicinity and give a higher weight to pixels at a center of the widget to identify the corner.

Example 13

The system of example 12 wherein the widget is placed by a user.

Example 14

The system of example 10 wherein use the gradient comprises define a score for pixels between the corners.

Example 15

The system of example 14 wherein the score for a pixel is calculated based on the gradient of the pixel and the gradient of a surrounding pixel.

Example 16

The system of example 15 wherein identifying the edge comprises:
identify a current pixel representing a corner;
check pixels surrounding the current pixel and picking as a next pixel in the edge a pixel with the lowest score;
set the current pixel as the next pixel;
repeat the checking and setting operations until a second corner pixel is reached.

Example 17

The system of example 10 wherein mapping each pixel in the region of the image to the pixel in the flat representation comprises:
establish a percentage in an X and Y dimension in the region of the image; and copy the color of the pixel in the region of the image at the percentage in the X and Y dimension to a pixel in the flat representation in at the percentage in the X and Y dimension.

Example 18

A computer storage medium comprising executable instructions that, when executed by a processor of a machine, cause the machine to perform operations comprising:
receive an image captured by a capture device, the image comprising an object having a non-linear side (106);
identify a plurality of corners of the object, the plurality of corners defining a region of the image to be flattened (108, 210);
define a gradient between each of the plurality of corners (306);
use the gradient to identify an edge between each of the plurality of corners, one edge approximating the non-linear side (112, 307, 308);
establish the dimensions of a flat representation (804);
map each pixel in the region of the image to a pixel in the flat representation (808); and
fill each pixel in the flat representation with the color of the corresponding pixel in the region of the image (810, 812).

Example 19

The medium of example 17 further comprising:
receive a location of a widget, the widget defining a general vicinity of a corner;
analyze pixels in the general vicinity and give a higher weight to pixels at a center of the widget to identify the corner.

Example 20

The medium of example 19 wherein using the gradient comprises calculate a score for pixels between the corners based on the gradient of a pixel and the gradient of a surrounding pixel and wherein identify the edge comprises:
identify a current pixel representing a corner;
check pixels surrounding the current pixel and pick as a next pixel in the edge a pixel with the lowest score;
set the current pixel as the next pixel;
repeat the check and set operations until a second corner pixel is reached.

Example 21

A method for flattening an image comprising:
receiving an image comprising an object having a non-linear side (106);
identifying a plurality of corners of the object, the plurality of corners defining a region of the image to be flattened (108, 210);
defining a gradient between each of the plurality of corners (306);
using the gradient to identify an edge between each of the plurality of corners, one edge approximating the non-linear side (112, 307, 308);
establishing the dimensions of a flat representation (804);
mapping each pixel in the region of the image to a pixel in the flat representation (808); and
filling each pixel in the flat representation with the color of the corresponding pixel in the region of the image (810, 812).

Example 22

The method of example 21 further comprising smoothing each edge.

Example 23

The method of example 21 wherein identifying the corners of the object comprises:
receiving an indication of a general vicinity of each corner;
analyzing pixels in the general vicinity to identify each corner.

Example 24

The method of example 23 further comprising:
receiving a location of a widget, the widget defining the general vicinity;
giving a higher weight to pixels at a center of the widget when analyzing pixels to identify a corner.

Example 25

The method of example 24 wherein the widget is placed by a user.

Example 26

The method of example 21 wherein using the gradient comprises defining a score for pixels between the corners.

Example 27

The method of example 26 wherein the score for a pixel is calculated based on the gradient of the pixel and the gradient of a surrounding pixel.

Example 28

The method of example 27 wherein identifying the edge comprises:
identifying a current pixel representing a corner;
checking pixels surrounding the current pixel and picking as a next pixel in the edge a pixel with the lowest score;
setting the current pixel as the next pixel;
repeating the checking and setting operations until a second corner pixel is reached.

Example 29

The method of example 21 wherein mapping and filling comprise:
establishing a percentage in an X and Y dimension in the region of the image; and copying the color of the pixel in the region of the image at the percentage in the X and Y dimension to a pixel in the flat representation in at the percentage in the X and Y dimension.

Example 30

The method of example 21 further comprising calculating cost scores from the gradient.

Example 31

The method of example 30 wherein calculating cost scores comprises:
creating a mapping for gradient scores, the mapping yielding an initial cost score for each gradient score; and
calculating a cost score based on the initial cost score and a cost score of at least one surrounding pixel.

Example 32

The method of example 31 wherein calculating the cost score is different when the at least on surrounding pixel is on a diagonal than when the at least one surrounding pixel is not on the diagonal.

Example 33

The method of example 31 wherein calculating the cost score is utilizes the lowest score from among scores of at least on surrounding pixel.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method performed by a processor for flattening an image comprising:
receiving, at the processor, an image comprising an object having a non-linear side;
identifying a plurality of corners of the object, the plurality of corners defining a region of the image to be flattened;
defining a gradient between corresponding pairs of each of the plurality of corners;
define a score for pixels between based on the gradient;
using the scores to identify an edge between each of the plurality of corners, one edge approximating the non-linear side;
responsive to identifying the edge between each of the plurality of corners, establishing dimensions of a flat representation;
mapping each pixel in the region of the image to a pixel in the flat representation; and
filling each pixel in the flat representation with the color of the corresponding pixel in the region of the image; and
outputting the image to a display.

2. The method of claim 1 further comprising smoothing each edge.

3. The method of claim 1 wherein identifying the corners of the object comprises:
receiving an indication from a user of a general vicinity of each corner;
analyzing pixels in the general vicinity to identify each corner.

4. The method of claim 3 wherein the indication comprises a widget and wherein the method further comprises:
receiving a location of the widget, the widget defining the general vicinity;
giving a higher weight to pixels at a center of the widget when analyzing pixels to identify a corner.

5. The method of claim 4 wherein the widget is placed by a user.

6. The method of claim 1 wherein the score for a pixel is calculated based on the gradient of the pixel and the gradient of a surrounding pixel.

7. The method of claim 6 wherein identifying the edge comprises:
identifying a current pixel representing a corner;
checking pixels surrounding the current pixel and picking as a next pixel in the edge a pixel with the lowest score;
setting the current pixel as the next pixel;
repeating the checking and setting operations until a second corner pixel is reached.

8. The method of claim 1 wherein mapping and filling comprise:
establishing a percentage in an X and Y dimension in the region of the image; and
copying the color of the pixel in the region of the image at the percentage in the X and Y dimension to a pixel in the flat representation in at the percentage in the X and Y dimension.

9. A system for flattening an image comprising:
a processor and executable instructions accessible on a computer-storage medium that, when executed, cause the processor to perform operations comprising:
receive an image comprising an object having a non-linear side;
identify a plurality of corners of the object, the plurality of corners defining a region of the image to be flattened;
define a gradient between corresponding pairs of each of the plurality of corners;
define a score for pixels based on the gradient;
use the scores to identify an edge between corresponding pairs of each of the plurality of corners, one edge approximating the non-linear side;
establish the dimensions of a flat representation;
map each pixel in the region of the image to a pixel in the flat representation; and
fill each pixel in the flat representation with the color of the corresponding pixel in the region of the image.

10. The system of claim 9 further comprising smooth each edge.

11. The system of claim 9 further comprising:
receive a location of a widget, the widget defining a general vicinity of a corner;
analyze pixels in the general vicinity and give a higher weight to pixels at a center of the widget to identify the corner.

12. The system of claim 11 wherein the widget is placed by a user.

13. The system of claim 9 wherein the score for a pixel is calculated based on the gradient of the pixel and the gradient of a surrounding pixel.

14. The system of claim 13 wherein identifying the edge comprises:
identify a current pixel representing a corner;
check pixels surrounding the current pixel and picking as a next pixel in the edge a pixel with the lowest score;
set the current pixel as the next pixel;
repeat the checking and setting operations until a second corner pixel is reached.

15. The system of claim 9 wherein mapping each pixel in the region of the image to the pixel in the flat representation comprises:
establish a percentage in an X and Y dimension in the region of the image; and
copy the color of the pixel in the region of the image at the percentage in the X and Y dimension to a pixel in the flat representation in at the percentage in the X and Y dimension.

16. A computer storage medium comprising executable instructions that, when executed by a processor of a machine, cause the machine to perform operations comprising:
receive an image captured by a capture device, the image comprising an object having a non-linear side;
identify a plurality of corners of the object, the plurality of corners defining a region of the image to be flattened;
calculate a gradient value for pixels between each of the plurality of corners;
assign a score to each of the pixels based on the gradient value;
use the score to identify an edge between each of the plurality of corners, one edge approximating the non-linear side;
establish dimensions of a flat representation;
map each pixel in the region of the image to a pixel in the flat representation; and
fill each pixel in the flat representation with the color of the corresponding pixel in the region of the image.

17. The medium of claim 16 further comprising:
receive a location of a widget placed by a user, the widget defining a general vicinity of a corner;
analyze pixels in the general vicinity and give a higher weight to pixels at a center of the widget to identify the corner.

18. The medium of claim 17 further comprising:
identify a current pixel representing a corner;
check pixels surrounding the current pixel and pick as a next pixel in the edge a pixel with the lowest score;
set the current pixel as the next pixel;
repeat the check and set operations until a second corner pixel is reached.

* * * * *